United States Patent [19]

Thielmann

[11] Patent Number: 4,702,195

[45] Date of Patent: Oct. 27, 1987

[54] DEVICE FOR CLEANING THE GAS NOZZLE OF A WELDING TORCH

[76] Inventor: Friedolin Thielmann, Fliederstrasse 9, 6342 Haiger 9/OT Rodenbach, Fed. Rep. of Germany

[21] Appl. No.: 862,230
[22] PCT Filed: Jun. 11, 1985
[86] PCT No.: PCT/EP85/00277
§ 371 Date: Feb. 11, 1986
§ 102(e) Date: Feb. 11, 1986
[87] PCT Pub. No.: WO86/00036
PCT Pub. Date: Jan. 3, 1986

[30] Foreign Application Priority Data

Jun. 13, 1984 [DE] Fed. Rep. of Germany ....... 3421885

[51] Int. Cl.⁴ ...................... B05C 11/00; B05B 15/02; B23D 79/02
[52] U.S. Cl. .................................... 118/72; 118/698; 239/107; 239/117; 15/88; 15/93 R; 29/81 F; 29/81 G; 29/81 H; 29/81 J; 901/42

[58] Field of Search ............... 239/106, 107, 114, 115, 239/117, 123; 118/302, 72, 679, 684, 697, 698; 228/57; 29/81 F, 81 G, 81 H, 81 J; 15/93 R, 88; 901/42

[56] References Cited

U.S. PATENT DOCUMENTS 3,393,872  7/1968  Rankin ............................ 239/117
4,027,349  6/1977  Clavin ............................ 118/72
4,469,043  9/1984  Kohler et al. .................... 118/302
4,583,257  4/1986  Bridges et al. ................... 15/93 R Primary Examiner—Sam Silverberg
Assistant Examiner—Terry J. Owens
Attorney, Agent, or Firm—Edmund M. Jaskiewicz

[57] ABSTRACT

Cleaning process for the gas nozzles of a welding torch in which the nozzle is guided to a processing position in which it is scraped clean by rotating blades and in which it is then sprayed with an antiadhesive agent after the blades are lowered.

9 Claims, 5 Drawing Figures

DEVICE FOR CLEANING THE GAS NOZZLE OF A WELDING TORCH

BACKGROUND OF THE INVENTION

The invention relates to a device for cleaning the gas nozzle of a welding torch in which weld splatters which have been deposited on the nozzle are scraped off by revolving blades and in which the nozzle is then sprayed with an anti-adhesive agent. In such devices the welding rod is guided through the nozzle and brought closer to the weld location with the nozzle. The welding material spatters a great deal during welding. Contaminants thus settle in the nozzle, which gradually close the nozzle. Therefore the nozzle must be cleaned often. Cleaning devices for this are known in the art in which, for example, an electronically controlled robot inserts the nozzle. Rotating blades scrape the nozzle clean. Next the robot moves the nozzle into a second position in which it is sprayed with an antiadhesive agent. Since the nozzle must be very precisely centered at the first cleaning position and, after centering, the rotating blades must be brought close to the nozzle, but after cleaning must be lowered again so the nozzle can be guided to the spraying position, the known devices are expensive. Finally, time is also lost because of the change of the individual processing positions.

The object of the invention is to indicate a cleaning device with a simple design and with which nozzles can be cleaned faster than previously.

SUMMARY OF THE INVENTION

This object is attained by a device which has a nozzle mount consisting of two stops and a piston which pushes the gas nozzle against the two stops. There is an inlet and discharge opening on the side of the device. Beneath the mount there are blades which can be adjusted axially, as well as diagnonally placed spraying nozzles for the anti-adhesive agent.

Because now the nozzle to be cleaned stays in one and the same position throughout the entire cleaning process, including the spraying with the antiadhesive agent, no time is lost by moving the nozzle back and forth in the device. Rather, the processing position can be arranged directly behind the inlet and discharge opening of the device.

DESCRIPTION OF THE DRAWINGS

Further details of the invention can be gathered from the subclaims as well as from the description of the embodiments.

Embodiments of the invention are shown in the drawing and specifically the following is shown in.

DESCRIPTION OF THE PREFERRED EMBODIMENTS

Figure 2:
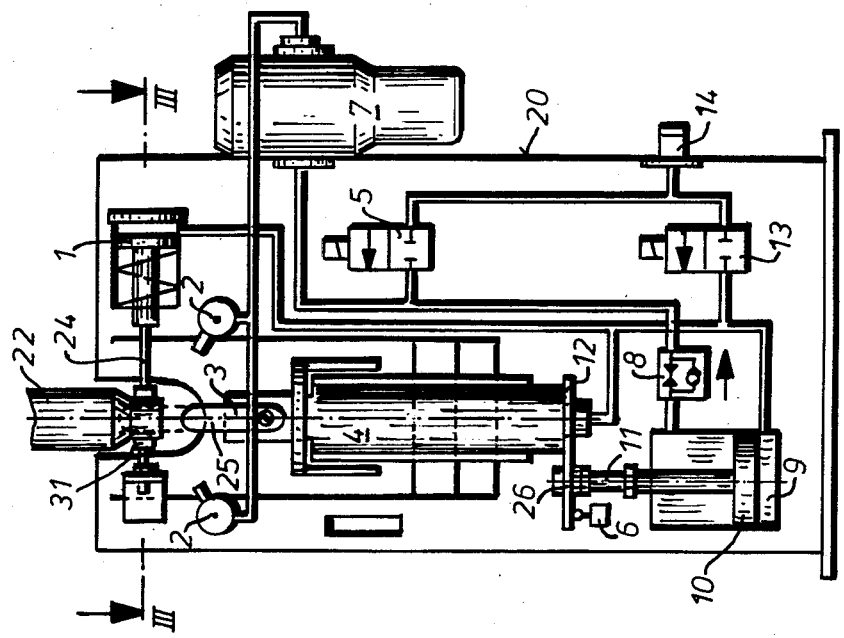
FIG. 2: a longitudinal section of the device
Figure 1:
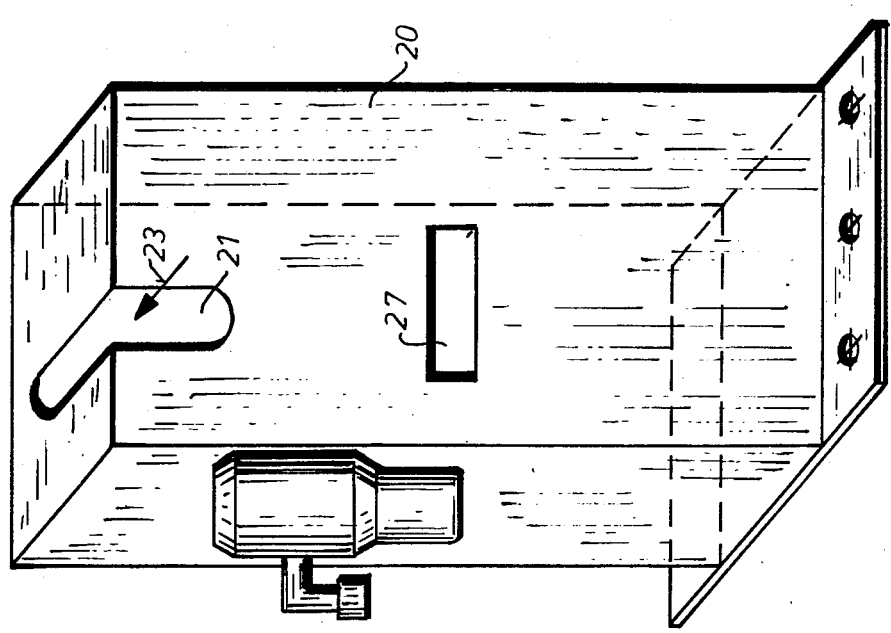
FIG. 1: the view of the device in perspective

Device 20 has an inlet opening 21 for nozzle 22 to be cleaned. The nozzle is inserted in the direction of arrow 23, for example with the help of the gripper arm of a robot. According to FIG. 2 nozzle (22) encounters two stops 31 and 32 which center it in the cleaning position. Stops 31 and 32 consist of adjustable screws with check nuts, to be able to center nozzles with varying diameters in the processing position. A pneumatically operated piston 24 pushes nozzle 22 against stops 31, 32 so that the nozzle is secured immovably to the device during processing.

Beneath the processing position a pneumatically driven motor 4 is provided which drives blade head 3. Blades 25 scrape nozzle 22 clean. By a pneumatically moved piston in cylinder 9, motor 4 and blade head 3 are supported to be adjustable in height by piston rod 11 and plate 12 carrying motor 4. When blades 25 are in the lowered position nozzle 22 can be inserted from in front into the device. Then motor 4 with blade head 3 is raised until blades 25 reach the nozzle.

After the nozzle has been scraped free of contaminants, motor 4 with blade head 3 is again lowered and spraying nozzles 2 spray nozzle 22 with the antiadhesive fluid. The antiadhesive fluid is in container 7 which can be pressurized by compressed air.

Solenoid valves 13 and 5 are provided for controlling the work process. If valve 13 is closed by the robot program, piston 24 is acted on by compressed air supplied through connection 14 and nozzle 22 is centered while, simultaneously, compressed air enters cylinder 9 beneath piston 10, raising piston 10 and thus motor 4. The cleaning process can now begin. After the cleaning process is over the motor is again lowered. As soon as plate 12 strikes a limit switch 6, the lowering process ends. Solenoid valve 5 can now be closed by the robot program. This valve allows compressed air to enter container 7 so that the antiadhesive liquid is sprayed out of nozzles 2 onto nozzle 22. By time-lag element or speed regulation valve 8 piston 24 is separated from the nozzle so that the nozzle can now be removed.

Figure 5:
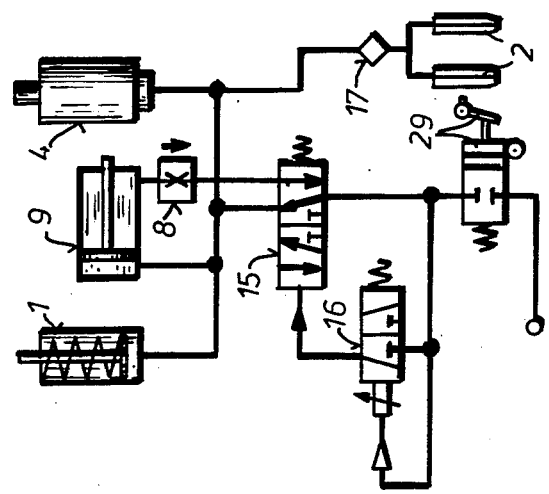
FIG. 5: a diagrammatic representation of the operation of the embodiment according to FIG. 4.
Figure 4:
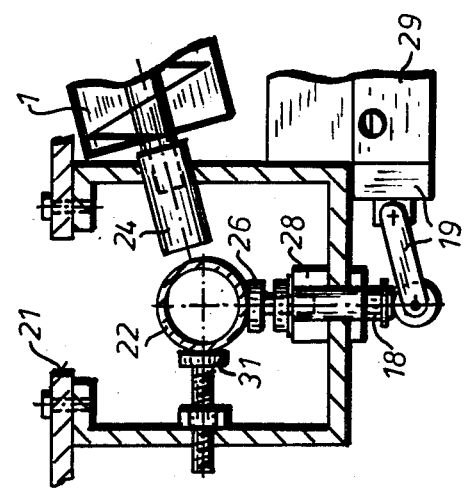
Figure 3:
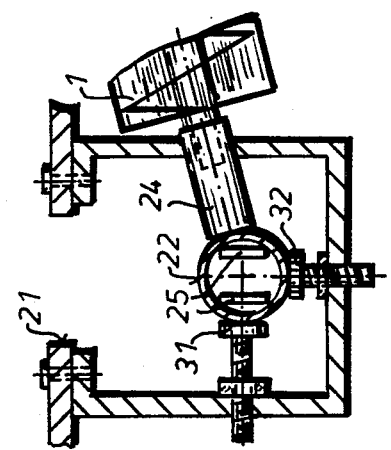
FIG. 3: a section along line III—III of FIG. 2
FIG. 4: a modified embodiment

According to FIGS. 4 and 5, solenoid valves 5 and 13 are controlled not by the robot program but by the inserted nozzle itself. One of centering screws 31, 32, in the present case centering screw 32, is replaced by centering screw 18 which is mounted axially movable in holder 28. If the nozzle is inserted it encounters screw 18 which shifts until its head 26 rests against holder 28. The lower end of the screw activates lever 19 which in turn acts on microswitch 29 and triggers the control process. Microswitch 29 acts on time valve 16 which in turn acts on multiple-path valve 15. The valves bring about the following control functions: the centering nozzle is secured by means of piston 24, motor 4 is raised and the blades scrape the nozzle clean, next the motor is lowered, opener 17 activates spray nozzles 2 so that the welding nozzle is sprayed with the antiadhesive spray and finally piston 24 is retracted. The nozzle can now be removed and used again.

I claim:

1. A device for cleaning the gas nozzle of a welding torch in which weld splatters have accumulated on the nozzle, comprising a housing (20) having a top and a side and there being an access opening (21) for a gas nozzle on said top and side, a pair of spaced stops (31,32) within said housing and against which a gas nozzle inserted through said access opening is positioned, a piston (24) movable against said positioned nozzle to secure said gas nozzle in position against said stops, rotatable cutting blades (25) axially movable into and out of said positioned gas nozzle to scrape weld splatters therefrom, and a pair of spraying nozzles (2) on both sides of said positioned gas nozzle below said stops and inclined towards said gas nozzle to spray an antiadhesive agent thereon when said gas nozzle is secured in its said position so that said gas nozzle remains in the same position for both scraping of weld splatter and spraying of anti-adhesive agent.

2. Device according to claim 1 wherein said cutting blades define a blade head (3), a motor (4) connected to said blade head by a revolving joint, and means for adjusting axially the blade head and motor together.

3. Device according to claim 2, wherein said adjusting means can be moved pneumatically or hydraulically.

4. Device according to claim 2 with a pneumatically driven motor (4).

5. Device according to claim 1 with a pneumatically or hydraulically operated centering piston (24).

6. Device according to claim 1 wherein one of stops (31, 32) comprises a limit switch.

7. Device according to claim 2 wherein a limit switch (6) triggers the adjusting movement of drive motor (4).

8. Device according to claim 7 wherein said limit switch (6) is disposed in the path of the axial movement of the motor.

9. Device according to claim 1 wherein stops (31, 32) are adjustable.

* * * * *